United States Patent [19]

Öberg

[11] Patent Number: 6,049,405
[45] Date of Patent: Apr. 11, 2000

[54] OPTICAL NODE IN AN OPTICAL BUS NETWORK

[75] Inventor: Magnus Öberg, Hägersten, Sweden

[73] Assignee: Telefonaktiebolaget LM Ericsson, Stockholm, Sweden

[21] Appl. No.: 08/930,040

[22] PCT Filed: Mar. 13, 1996

[86] PCT No.: PCT/SE96/00323

§ 371 Date: Nov. 20, 1997

§ 102(e) Date: Nov. 20, 1997

[87] PCT Pub. No.: WO96/31025

PCT Pub. Date: Oct. 3, 1996

[30] Foreign Application Priority Data

Mar. 27, 1995 [SE] Sweden .................................. 9501075

[51] Int. Cl.[7] .................................................. H04B 10/20
[52] U.S. Cl. ........................ 359/119; 359/125; 359/110; 359/161
[58] Field of Search .................... 359/125, 119, 359/110, 166, 161

[56] References Cited

U.S. PATENT DOCUMENTS

| | | | |
|---|---|---|---|
| 5,003,531 | 3/1991 | Farinholt et al. ...................... | 370/16.1 |
| 5,159,595 | 10/1992 | Flanagan et al. ...................... | 370/85.15 |
| 5,333,130 | 7/1994 | Weissmann et al. ...................... | 370/16 |
| 5,548,431 | 8/1996 | Shin et al. ............................... | 359/119 |
| 5,903,371 | 5/1999 | Arecco et al. ............................ | 359/119 |
| 5,963,348 | 10/1999 | Oberg ....................................... | 359/114 |

FOREIGN PATENT DOCUMENTS 0519712  12/1992  European Pat. Off. .

406164613A  6/1994  Japan ...................................... 359/119

OTHER PUBLICATIONS

Tsong–Ho Wu, "A Novel Passive Protected SONET Bidirectional Self–Healing Ring Architecture" *Journal of Lightwave Technology*, vol. 10, No. 9, pp. 1314–1322 (Sep. 1992).

"Fault–Tolerant Fiber–Optic Network Using Wave–Division Multiplexing/Demultiplexing Couplers", *IBM Technical Disclosure Bulletin*, vol. 31, No. 10, Mar. 1989.

Fabrizio Forghieri et al., "Reduction of Four–Wave Mixing Crosstalk in WDM Systems Using Unequally Spaced Channels", *IEEE Photonics Technology Letters*, vol. 6, No. 6, pp. 754–756, (Jun. 1994).

Kanad Ghose, "Performance Potentials of an Optical Fiber Bus Using Wavelength Division Multiplexing", *SPIE*, vol. 1849 Optoelectronic Interconnects (1993) pp. 172–183.

*Primary Examiner*—Leslie Pascal
*Assistant Examiner*—Hanh Phan
*Attorney, Agent, or Firm*—Burns, Doane, Swecker & Mathis, L.L.P.

[57] ABSTRACT

An optical node in an optical network includes transmitters (Tx:1–3) and receivers (Rx:1–3) adapted to particular wavelength channels and arranged to communicate via the optical bus network, with receivers and transmitters for corresponding wavelength channels in other nodes. The node includes optical safety switching devices (S1–S5) in connection with the transmitters (Tx:1–3) and receivers (Rx:1–3) of the node, so that the transmitters (Tx:1–3) and receivers (Rx:1–3) can be switched from a first optical fiber (1,2) to a second optical fiber (1,2).

8 Claims, 2 Drawing Sheets

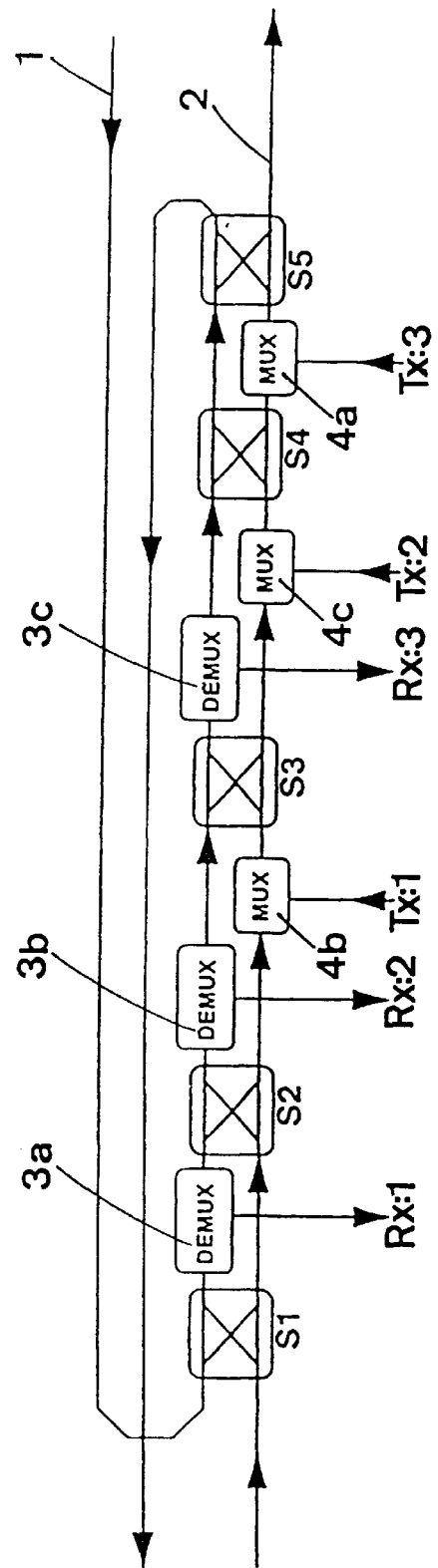
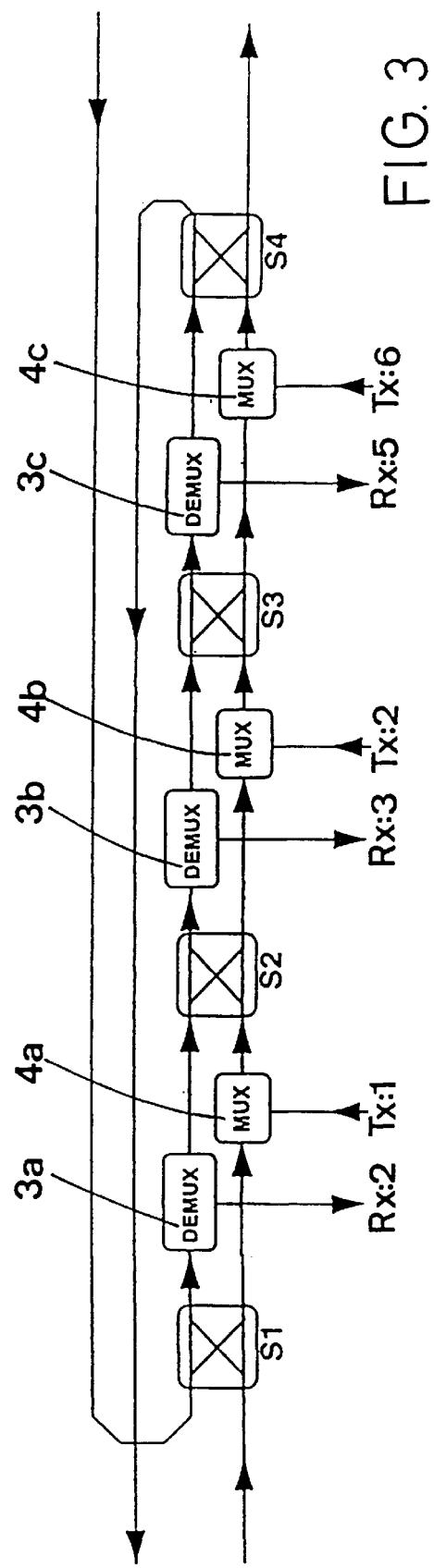

OPTICAL NODE IN AN OPTICAL BUS NETWORK

TECHNICAL BACKGROUND

The present invention concerns an optical node in an optical bus network. The node comprises transmitters and receivers which are adapted to particular wavelength channels and are arranged to communicate via the optical bus network with receivers and transmitters for corresponding wavelength channels in other nodes.

The invention also concerns a process carried out in an optical bus network.

PRIOR ART

Within the field of telecommunications, there is frequently a need for high transmission capacity. Large amounts of data can be transmitted very rapidly by using optical transmission via modulated light signals.

Wavelength multiplexing (WDM) is used to transmit a plurality of light signals via a common optical medium. The signals are sent via independent wavelength channels which can be present simultaneously in an optical fibre.

Optical transmission can be brought about in an optical bus network which comprises a plurality of optically connected nodes adapted for mutual communication. In the case of an optical bus network having N nodes connected in series with one another via two optical fibres, communication in both directions between the nodes can be brought about as a result of the first fibre being used for transmission in one direction and the second fibre being used for transmission in the other direction. Each node communicates with each other node via a single wavelength channel. This means that at least N–1 wavelength channels are present at the same time on each optical fibre.

Each node comprises at least N–1 receivers and N–1 transmitters which communicate via wavelength channels with transmitters and receivers corresponding to these channels in the other nodes. Each transmitter transmits information which is input on one of the two optical fibres; each receiver receives information which is tapped from one of the two optical fibres.

The optical bus network is preferably arranged so that, in the event of an interruption in the network, communication between all of the nodes can be maintained by a pair of reserve fibres intended for interruption situations. However this type of interruption actuates the communication between the different nodes and involves one or more receivers and transmitters in each node having to change such that it receives or sends, respectively, a wavelength channel via some of these reserve fibres. In order to restrict the number of wavelength channels used, it is possible to re-use channels. Re-using channels means that one or more wavelength channels received in a node are used for transmission from the same node on the same fibre when this is possible. The smallest number of channels which can be used is restricted by the number of nodes to $N^2/4$ if N is even or $(N^2-1)/4$ if N is odd. Since the same channel is consequently used many times for transmitting on the same fibre, problems can arise when communication between two nodes is also to be maintained when there has been an interruption in the network.

U.S. Pat. No. 5,159,595 has already disclosed a network comprising a number of nodes which are connected to one another in an annular configuration. Each node can communicate with each other node via the network. In the case of a conventional network configuration, each message is transmitted between two nodes via both fibres from a dispatching node to a destination node; in the same way a message from both oppositely directed fibres is received in a node. This means that communication in the case of an interruption in the bus network can be maintained without switching being necessary. A disadvantage with this system is that the network normally has an unnecessarily large amount of wavelength channels and is therefore over-dimensioned.

DESCRIPTION OF THE INVENTION

The invention concerns an optical node which is adapted for communicating, via transmitters and receivers connected to two optical fibres, with at least two other optical nodes in an optical bus network. This bus network comprises extra communication paths for ensuring that communication between two nodes is also maintained after an interruption in the bus network.

A problem with this type of secured bus network is that if a cable is defective receivers and transmitters need to change such that they communicate via the other optical fibre so that communication can be maintained.

The invention seeks to overcome the above problem by providing an optical node which in a simple manner enables transmitters/receivers to be switched between the bus network fibres when there is an interruption in the network. The node according to the invention comprises a plurality of transmitters and receivers which in pairs permit communication with any other node via two optical fibres in a bus network. The optical fibres connect the nodes in the bus network and permit bidirectional communication between each of the nodes. The node comprises at least the same amount of safety switching devices as the number of nodes in the bus network. These safety switching devices are arranged to switch transmitters and receivers in a node between the two optical fibres.

The invention also concerns a node which does not necessarily comprise transmitters and receivers but which comprises a plurality of multiplexers and demultiplexers which couple wavelength channels between the optical fibres of the bus network and thereby connect transmitters and receivers for these wavelength channels to the optical fibres. The node comprises at least the same amount of safety switching devices as the number of nodes in the bus network, these safety switching devices being arranged so as to switch these multiplexers and demultiplexers between the two optical fibres.

By virtue of the node construction according to the invention, in the case of channel allocation with re-use of the channels such that the minimum number of wavelength channels are allocated to transmitters and receivers for fixed wavelengths in the bus network, it is possible to switch these transmitters and receivers between the two optical fibres in such a way that the transmitter and receiver channel allocation can be maintained for communication between the nodes included in the bus network even when there has been an interruption therein.

Owing to this relatively simply design, the node construction according to the invention is also advantageous in the case of other types of bus network in which the above-mentioned advantageous channel allocation process is not used. However one condition for the use of the node is that there should be a risk of the bus network's being affected by changes to the network configuration, for example, an interruption somewhere in the bus network, these changes requiring transmitters and receivers to be switched between the optical fibres.

The invention also concerns a process carried out in an optical node when there is an interruption in the bus network.

DESCRIPTION OF THE FIGURES

FIG. 2 shows a first embodiment of the optical node according to the invention; and FIG. 3 shows a second embodiment of the optical node according to the invention.

PREFERRED EMBODIMENTS

The invention will now be described in greater detail with reference to the Figures and in particular to FIG. 2 and FIG. 3 which show two different embodiments of the optical node according to the invention.

Figure 1A:
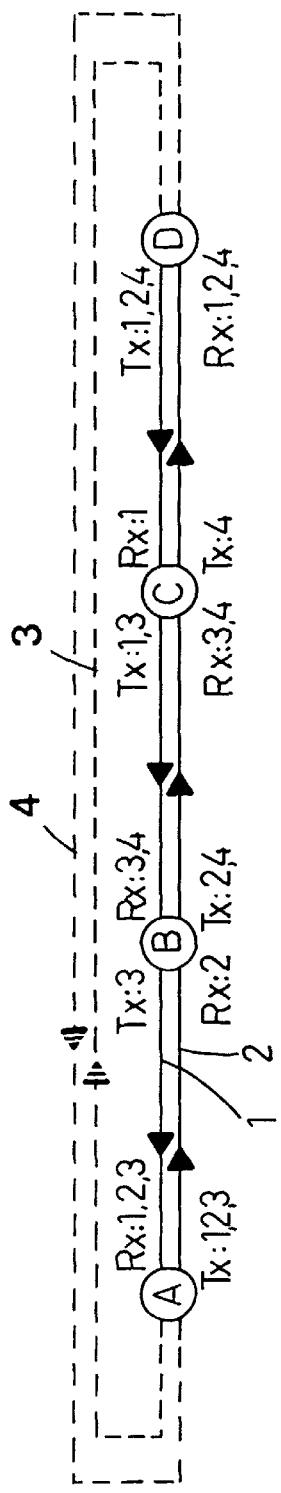
FIGS. 1a–c show an optical bus network with four nodes in the case of different interruption situations in the bus network.
Figure 1B:
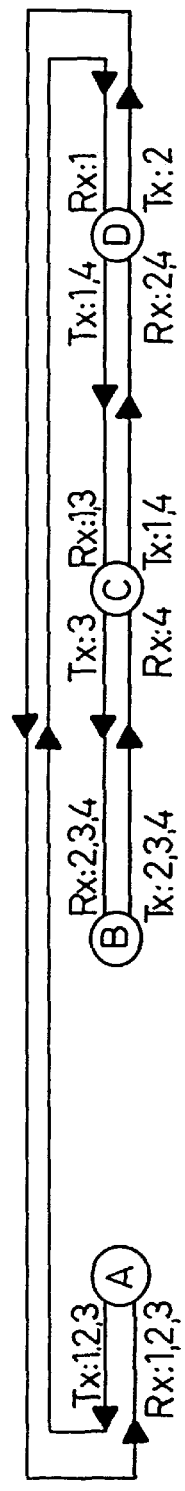
Figure 1C:
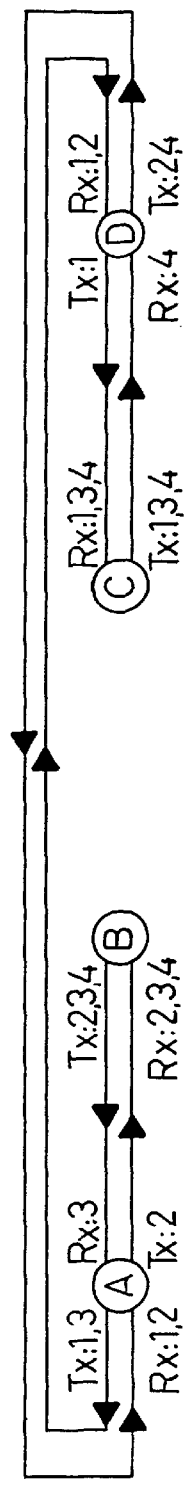

FIGS. 1a–c show an optical bus network which has four nodes A, B, C, D and is provided with an extra fibre pair 3, 4 which can be used in the case of an interruption in the regular bus network. Each node comprises three transmitters and three receivers. Depending on where in the network the node is located, a varying number of transmitters Tx:1–4 and receivers Rx:1–4 are connected to the first fibre 1. A first node A, for example, has three receivers Rx:1–3 connected to the fibre 1, all of whose signals go towards the left in the Figures, and three transmitters Tx:1–3 connected to the fibre 2, all of whose signals go to the right in the Figures. On the other hand a final node D has three receivers Rx: 1,2,4 connected to fibre 2 and three transmitters Tx: 1,2,4 connected to fibre 1. The intermediate nodes have both transmitters Tx and receivers Rx connected to both fibres.

Each transmitter Tx in the optical bus network shown transmits a signal at a given wavelength, a so-called wavelength channel. Each receiver Rx in the network receives a given wavelength channel and allows other channels to pass on to the next node. Two channels of the same wavelength never occur on the same common fibre section since in that case the channels would not be separated in the receivers. This means that a channel which is received by a receiver in one node has to be removed entirely from the optical bus network. A transmitter/receiver pair in each node is reserved for communication with each other node, i.e. a transmitter in a first node transmits a wavelength channel to a specific other node and a receiver in the first node receives a wavelength channel from the other node. This transmitter and this receiver in the first node, which together enable the first node to communicate entirely with the second node, form a transmitter/receiver pair in the first node. Each node consequently comprises the same amount of transmitter/receiver pairs as the number of other nodes present in the network.

FIG. 1a shows the optical bus network in the normal case, i.e. without interruptions. In this Figure the extra pair of fibres is illustrated in broken lines to show more clearly that it is not used for communication in the normal situation. In the bus network shown channels are re-used, i.e. the wavelength channels received in a node are used for transmission from the same node on the same fibre when this is possible in order that the minimum number of channels can be used for communication between the different nodes. In the case of the bus network shown in FIG. 1a, the wavelength channel 2 is received by the receiver Rx:2. A transmitter Tx:2 in the same node re-uses the same channel for transmission to the node D. Channel re-use in a bus network having N nodes means that the bus network has to be allocated a minimum of $(N^2-1)/4$ wavelength channels if N is odd and $N^2/4$ wavelength channels if N is even. Each node is allocated N−1 channels on each fibre for communication to or from the node. In the example shown in the Figures, with a bus network having four nodes, this means that communication between all the nodes can be maintained if at least four different wavelength channels are used for this communication. Each node has been allocated three wavelength channels for transmission to the other nodes. These wavelength channels are re-used directly when they have been received in a node. The node according to the invention can of course also be found in bus networks in which channels are not re-used.

FIG. 1b shows the new configuration which is obtained after a fibre break between node A and node B in the original bus network. In this case the extra fibre has to be used in order to permit communication between node A and the other nodes. Advantageous channel distribution enables the communication between the different nodes to use the same channels as in the case according to FIG. 1a, in spite of the fact that the channel allocation according to FIG. 1a is based on the allocation of the minimum number of wavelength channels. However, in all the nodes, given transmitters and receivers have to use opposite optical fibres to the case shown in FIG. 1a After the interruption, node A is last in the network for traffic passing to the right and should therefore have three receivers connected to fibre 2 and three transmitters connected to fibre 1. In node B the changes are substantially fewer, since it is only transmitters and receivers for the communication between node A and node B which need to be switched between the fibres. Before the interruption occurred the transmitters in node B intended for the communication with node A were used for transmission via fibre 1 in the direction towards the left in the Figures. After the interruption these transmitters have instead to communicate with node A via fibre 2, in the direction going towards the right. In contrast the receivers in node B intended for reception from node A have to be changed over to receive information from the fibre going towards the left, fibre 1. In corresponding manner, one transmitter/receiver pair has to be switched in node C and one in node D, etc. An interruption between node A and node B consequently results in all the transmitters and receivers in node A having to be switched between the fibres, whilst only one transmitter/receiver pair needs to be switched in the other nodes. FIG. 1c shows the corresponding case for an interruption between node B and node C. The Figures show that in some cases it is necessary to switch transmitters and receivers between the two optical fibres which pass through a given node. It will be appreciated that the examples shown in the Figures are only some cases of many in which such switching is desirable.

FIG. 2 shows a first embodiment for an optical node which is configured so as to carry out the above-mentioned switching. The node shown in the Figures is intended for the bus network shown in FIG. 1; each node therefore comprises three transmitters Tx and three receivers Rx with fixed wavelength allocation, which are connected to two optical fibres 1, 2. These fibres pass through the node such that both fibres 1, 2 in the node transmit in the same direction. The node shown in FIG. 2 corresponds to node A in FIG. 1. Transmission from the node therefore occurs via three transmitters Tx:1–3, intended for wavelength channels 1, 2 and 3. As indicated in connection with FIG. 1, reception in the node occurs via the same wavelength channels 1, 2 and 3. The receiver Rx: 1 is disposed furthest upstream in the node and the transmitter Tx:3 is disposed furthest downstream in the node. The node comprises three demultiplexers 3a,b,c for tapping the wavelength channels to the respective receivers Rx:1–3 and three multiplexers 4a,b,c for inputting the wavelength channels from corresponding transmitters Tx:1–3 into the two optical fibres 1, 2.

The node also comprises five 2×2 safety switching devices or safety change-over devices S1–S5 in order that the necessary switching in the node can be carried out when there are changes in the bus network. Each safety switching device comprises two inputs and two outputs, of which a first input is connected to a first optical fibre 1 and a second input is connected to a second optical fibre 2; in a corresponding manner, a first output is connected to the first optical fibre 1 and a second output is connected to the second optical fibre 2. When the switching devices are in the first state, signals are coupled through from the input which is connected to fibre 1 to the output which is connected to this fibre, whilst signals from the input which is connected to fibre 2 are coupled to the output which is connected to the same fibre. When the safety switching devices are in the other state, a signal from the input which is connected to fibre 1 is further coupled to the output which is connected to fibre 2; in corresponding manner, the signal at the input which is connected to fibre 2 is coupled to the output which is connected to fibre 1. In the embodiment shown the safety switching or change-over devices are arranged so that there is never more than precisely one receiver and precisely one transmitter between two safety changeover devices S1–S5. A transmitter/receiver pair Tx:1/Rx:2, Tx:2/Rx:3, which communicates with a given other node, never uses the same fibre and this pair can then be located together with the safety change-over devices S1–S5 on each side. However the receiver and transmitter in this pair have to be arranged so that the receiver, i.e. the demultiplexer 3a, 3b, 3c for tapping to a receiver, is never downstream in the node in relation to the transmitter and its multiplexer 4a, 4b, 4c. In the case of the advantageous channel allocation when the minimum number of wavelengths is used, the node then has to comprise five safety change-over devices, i.e. N+1 safety change-over devices, since a transmitter with a given wavelength should never be located upstream in the node compared with a receiver for the same wavelength. This means that at least one safety switching device has to be disposed between the multiplexer 4a and the demultiplexer 3a for one of the transmitter/receiver pairs. In the embodiment shown in FIG. 2 the demultiplexer 3a is disposed furthest upstream in the node and the multiplexer 4a is disposed furthest down-stream in the node, with the safety switching devices S1, S2 on each side of the demultiplexer 3a and the safety switching devices S4, S5 on each side of the multiplexer 4a. This divided demultiplexer/multiplexer pair 3a, 4a can also be located in other positions in the node provided that the demultiplexer 3a is never arranged downstream in the bus network relative to the multiplexer 4a.

If further wavelengths are introduced into the bus network according to FIG. 1, one node with only four safety change-over devices, i.e. N safety change-over devices, is sufficient for switching to be carried out in every interruption situation in the bus network. One example of such a situation is shown in FIG. 3 which shows a situation in which two further wavelength channels 5 and 6 permit a node construction with N safety switching devices.

In the normal case shown in FIG. 1a for communication in a bus network with four nodes and channel re-use, all the transmitters Tx:1–3 in node A transmit on fibre 2 and all the receivers Rx:1–3 in node A listen on fibre 1. As concerns node A this means that the safety switching devices S1–S5 in the node according to FIG. 2 have to be held in a first state or a normal state, i.e. without switching between the fibres. However when an interruption occurs between two nodes, the safety switching devices have to change to another, switched, state. FIG. 1c shows by way of example a cable break between node B and node C. In this case the transmitters for wavelength channel 1 and wavelength channel 3 in node A have to be coupled to fibre 1; at the same time the receivers for wavelength channels 1 and 2 have to be switched to fibre 2. This can be carried out as a result 5 of the switching devices being actuated so that they change over to a different state in which switching between fibre 1 and fibre 2 occurs.

Table 1 below shows which fibre (1 or 2) is used for respective transmitters and receivers in node A for each type of interruption situation in the bus network. The table below illustrates the first state of the safety switching devices with two parallel lines. The second state of the safety switching devices is shown by a cross X The table below shows the state for each safety switching device in node A in the case of different interruption situations and the node design according to FIG. 2.

TABLE 1

|  | Tx:1 | Tx:2 | Tx:3 | Rx:1 | Rx:2 | Rx:3 | S1 | S2 | S3 | S4 | S5 |
| --- | --- | --- | --- | --- | --- | --- | --- | --- | --- | --- | --- |
| Normal case: | 2 | 2 | 2 | 1 | 1 | 1 | II | II | II | II | II |
| Interruption A-B: | 1 | 1 | 1 | 2 | 2 | 2 | X | II | II | II | X |
| Interruption B-C: | 1 | 2 | 1 | 2 | 2 | 1 | X | II | X | X | X |
| Interruption C-D: | 1 | 2 | 2 | 1 | 2 | 1 | II | X | X | II | II |

If an interruption in the network occurs between node B and node C, this leads to wavelength channels 1 and 3 having to be transmitted via fibre 1 from node A, instead of via fibre 2, as in the normal case. The multiplexers 4a, 4b for coupling-in these wavelength channels therefore have to be switched so that the channels are coupled-in via fibre 1 instead. In a corresponding manner, FIG. 1c shows that the receivers for channels 1 and 2 have to be connected to fibre 2 following an interruption. The demultiplexers 3a, 3b, which tap the wavelength channels 1 and 2, therefore have to be switched so as to tap these wavelength channels from fibre 2. Table 1 shows that a node adapted to the interruption is obtained if the safety switching devices S1, S3, S4 and S5 are actuated so as to change state.

A node in a bus network according to FIG. 2 with four nodes should consequently comprise five safety switching devices S1–S5 in order that the transmitters and receivers, in the case of the channel allocation shown in FIG. 1 with channel reuse, are able to be switched to each desired fibre situation. Generally this means that a node in a bus network having a total of N nodes should comprise N+1 safety switching devices if the minimum number of channels have been allocated in the bus network, i.e. $(N^2-1)/4$ channels if N is odd and $N^2/4$ channels if N is even, in order that transmitters and receivers can be switched so that it is possible to adapt to every possible interruption situation in the network.

Provided that the channel allocation for the bus network is not carried out with complete channel re-use, a functioning node in a bus network having N nodes can be produced with N safety switching devices, i.e. one safety switching device less than is shown in FIG. 2. FIG. 3 shows this node construction for node A. The node comprises only four nodes and does not function satisfactorily for the situation shown in FIGS. 1a–c in which complete channel re-use is utilized. In the embodiment shown in FIG. 3 two further channels, wavelength channels 5 and 6, have been added. These extra channels mean that four safety switching devices S1–S4 are sufficient in the node. If the channels are allocated so that only N–2 or fewer transmitter and receiver wavelengths in a node are the same, i.e. at least one receiver and at least one transmitter do not operate at corresponding wavelengths, it is possible to use a node having N 2×2 safety switching devices, according to FIG. 3. Alternatively, the same node configuration can be used if the communication to and from the other nodes is to be carried out in pairs on the same wavelengths, i.e. node A talks to node B on the same wavelength as on which node B talks to node A, etc. A transmitter is then placed together with a receiver on the same wavelength between two separate 2×2 safety switching devices.

The invention is not restricted to the above embodiments described with reference to the Figures but can be modified within the scope of the following claims.

I claim:

1. Optical node comprising at least N–1 transmitters and at least N–1 receivers which are adapted such that, via a bus network having two optical fibres arranged to transmit in different directions to N–1 other optical nodes, they communicate with receivers and transmitters in these further nodes, wherein the node further comprises at least N optical safety switching devices which are arranged to switch the receivers and the transmitters between the optical fibres when there is an interruption in the bus network.

2. Optical node comprising transmitters, receivers and at least N–1 multiplexers arranged to input a corresponding number of wavelength channels from the transmitters into one of two optical fibres in a bus network and at least N–1 wavelength-selective demultiplexers which are arranged to tap a corresponding number of wavelength channels from one of the two optical fibres in the bus network to the receivers, these wavelength channels being arranged to transmit in different directions, via the two optical fibres of the bus network, to the receivers (Rx:1–3) and from the transmitters (Tx:1–3), respectively, corresponding to the wavelength channels in connection with N–1 other optical nodes in the bus network, wherein the node further comprises at least N optical safety switching devices which are arranged to switch the multiplexers and/or demultiplexers between the optical fibres of the bus network when there is an interruption therein.

3. Optical node according to claim 1, wherein the optical fibres are arranged to pass through the safety switching devices in the same transmission direction from a position upstream of a first safety switching device disposed in the node to a position downstream of a final safety switching device disposed in the node.

4. Optical node according to claim 1, wherein each of the transmitters and each of the receivers has a fixed wavelength allocation.

5. Optical node according to claim 2, wherein the multiplexers and the demultiplexers are arranged in pairs in the node so that each multiplexer/demultiplexer pair comprises one multiplexer and one demultiplexer which are arranged to input or tap the wavelength channels which together maintain the connection to and from another node; and wherein at least one safety switching device is arranged on each side of the multiplexer/demultiplexer pair, this safety switching device being arranged such that, if necessary, it couples the multiplexer/demultiplexer pair disposed upstream of the safety switching device to the opposite fibre.

6. Optical node according to claim 1, wherein the node is in the optical bus network with N nodes and advantageous channel allocation, communication between all the nodes occurring via $N^2/4$ wavelength channels if N is even and $(N^2-1)/4$ channels if N is odd, wherein the node comprises N+1 safety switching devices, of which at least one safety switching device is disposed between a demultiplexer and a multiplexer in a multiplexer/demultiplexer pair.

7. Optical node comprising at least N–1 transmitters with fixed channel allocation, each of which transmitters is connected to a multiplexer arranged to input a wavelength channel from the transmitter to an optical fibre in a bus network having two optical fibres, and N–1 receivers with fixed channel allocation, each of which receivers is connected to a wavelength-selective demultiplexer arranged to tap a wavelength channel from one optical fibre in a bus network to the receiver, the wavelength channels being arranged to transmit in different directions, via the two optical fibres in the bus network, to receivers and transmitters corresponding to the wavelength channels, in connection with N–1 other nodes in the bus network, wherein:

the node further comprises N–1 multiplexer/demultiplexer pairs which are adapted for communicating with other nodes and each of which comprises a multiplexer and a demultiplexer which are arranged to input and tap, respectively, the wavelength channels which together maintain the connection to and from a second node;

the node further comprises at least N optical safety switching devices;

the safety switching devices are arranged on each side of each multiplexer/demultiplexer pair, such that the multiplexer/demultiplexer pairs are arranged so as to be coupled to opposite fibres; and both optical fibres are arranged to pass through the safety switching devices in the same transmission direction from a position upstream of a first safety switching device disposed in the node to a position downstream of a further safety switching device disposed in the node.

8. Optical node comprising:

two optical fibres for transmitting in different directions to N–1 other nodes in the bus network, these optical fibres transmitting in the same direction through the node from a position upstream of the node to a position downstream of the node;

N–1 transmitters with fixed channel allocation each of which is connected to a multiplexer arranged to input a wavelength channel from the transmitter into an optical fibre in a bus network;

N−1 receivers with fixed channel allocation each of which is connected to a wavelength-selective demultiplexer arranged to tap a wavelength channel from one optical fibre in a bus network to the receiver, the wavelength channels being arranged to transmit in different directions, via the two optical fibers, to receivers and transmitters corresponding to the wavelength channels in connection with N−1 other nodes in the bus network;

N−1 multiplexer/demultiplexer pairs for communicating with other nodes, these multiplexers/demultiplexer pairs being arranged to input and tap, respectively, the wavelength channels which together maintain the connection to and from another node; and, arranged between the upstream position in the node and the downstream position in the node: and N+1 optical safety switching devices which are arranged to couple multiplexers and demultiplexers between the two fibres and which are arranged on each side of each multiplexer/demultiplexer pair and, in the case of a multiplexer/demultiplexer pair, are both arranged on each side thereof and between the multiplexer and demultiplexer in the pair, such that the multiplexers are arranged downstream of the demultiplexers in the bus network.

* * * * *